US00RE40145E

(19) United States
(12) Reissued Patent
Leighton

(10) Patent Number: US RE40,145 E
(45) Date of Reissued Patent: Mar. 11, 2008

(54) ULTRA-THIN FLEXIBLE DURABLE RADIO FREQUENCY IDENTIFICATION DEVICES AND HOT OR COLD LAMINATION PROCESS FOR THE MANUFACTURE OF ULTRA-THIN FLEXIBLE DURABLE RADIO FREQUENCY IDENTIFICATION DEVICES

(75) Inventor: Keith R. Leighton, Sheffield Lake, OH (US)

(73) Assignee: Leighton Technologies LLC, Suffern, NY (US)

(21) Appl. No.: 10/773,810

(22) Filed: Feb. 6, 2004

Related U.S. Patent Documents

Reissue of:
(64) Patent No.: 6,441,736
Issued: Aug. 27, 2002
Appl. No.: 09/606,945
Filed: Jun. 29, 2000

U.S. Applications:
(63) Continuation of application No. 09/158,290, filed on Sep. 22, 1998, now Pat. No. 6,214,155, which is a continuation of application No. 08/727,789, filed on Oct. 7, 1996, now Pat. No. 5,817,207.
(60) Provisional application No. 60/005,685, filed on Oct. 17, 1995.

(51) Int. Cl.
*G08B 13/14* (2006.01)

(52) U.S. Cl. ..... 340/572.1; 156/298; 156/312
(58) Field of Classification Search ..... 340/572.1, 340/572.4, 572.2; 156/298, 312, 300, 311
See application file for complete search history.

(56) References Cited

U.S. PATENT DOCUMENTS 2,532,501 A 12/1950 Johnson
2,874,751 A 2/1959 Norton
3,681,167 A 8/1972 Moore (Continued)

FOREIGN PATENT DOCUMENTS

DE 18 10 986 6/1970
DE 33 40 600 C1 1/1985
DE 37 21 822 C1 11/1988

(Continued)

OTHER PUBLICATIONS

SUMMONS for Case No. CV–SACV05–513 AHS (RNBx) dated May 27, 2005.
Complaint and Jury Demand for Case No. CV–SACV05–513 AHS (RNBx) dated May 27, 2005.
Notice of Interested Parties for Case No. CV–SACV05–513 AHS (RNBx) dated May 27, 2005.

(Continued)

*Primary Examiner*—Anh V. La

(57) ABSTRACT

A ultra-thin flexible durable radio frequency plastic of other substrate identification device, such as cards, tags, badges, bracelets and labels including at least one electronic element embedded therein and a hot or cold lamination process for the manufacture of radio frequency identification devices including a micro IC chip embedded therein. The process results in a device having an overall thickness in the range of 0.005 inches to 0.033 inches with a surface suitable for receiving dye sublimation printing—the variation in the device thickness across the surface is less than 0.0005 inches. The hot lamination process of the present invention results in an aesthetically pleasing device which can be used as a sticker when adhesive is applied to the device. The invention also relates to a plastic device in all shapes and sizes formed in accordance with the hot lamination process of the present invention and can withstand harsh chemicals and various pressures.

44 Claims, 4 Drawing Sheets

U.S. PATENT DOCUMENTS

| | | | | |
|---|---|---|---|---|
| 3,769,132 | A | | 10/1973 | Cram |
| 3,820,090 | A | | 6/1974 | Wiegand |
| 3,879,251 | A | | 4/1975 | Ingham |
| 3,994,225 | A | | 11/1976 | Sitzberger |
| 4,108,713 | A | | 8/1978 | Weisz |
| 4,180,608 | A | * | 12/1979 | Del ..... 428/196 |
| 4,204,822 | A | | 5/1980 | Hewitt |
| 4,216,577 | A | | 8/1980 | Badet |
| 4,242,789 | A | | 1/1981 | Fox |
| 4,263,523 | A | | 4/1981 | Wiegand |
| 4,290,838 | A | | 9/1981 | Reavill |
| 4,392,909 | A | * | 7/1983 | Bohn et al. ..... 156/306.9 |
| 4,417,413 | A | | 11/1983 | Hoppe et al. |
| 4,450,024 | A | | 5/1984 | Haghiri-Tehrani |
| 4,457,798 | A | | 7/1984 | Hoppe |
| 4,460,825 | A | | 7/1984 | Haghiri-Tehrani et al. |
| 4,474,292 | A | | 10/1984 | Haghiri-Tehrani et al. |
| 4,499,371 | A | | 2/1985 | Rose |
| 4,550,057 | A | | 10/1985 | Kataoka |
| 4,563,575 | A | | 1/1986 | Hoppe et al. |
| 4,587,413 | A | | 5/1986 | Hoppe et al. |
| 4,617,216 | A | | 10/1986 | Haghiri-Tehrani |
| 4,668,314 | A | | 5/1987 | Endoh et al. |
| 4,697,073 | A | | 9/1987 | Hara |
| 4,701,236 | A | | 10/1987 | Vieilledent |
| 4,714,980 | A | | 12/1987 | Hara |
| 4,746,392 | A | | 5/1988 | Hoppe |
| 4,752,204 | A | | 6/1988 | Kataoka |
| 4,788,102 | A | | 11/1988 | Koning et al. |
| 4,792,843 | A | | 12/1988 | Haghiri-Tehrani et al. |
| 4,795,898 | A | | 1/1989 | Bernstein et al. |
| 4,803,542 | A | | 2/1989 | Haghiri-Tehrani |
| 4,824,511 | A | * | 4/1989 | Hartman et al. ..... 156/306.6 |
| 4,837,184 | A | | 6/1989 | Lin et al. |
| 4,841,134 | A | | 6/1989 | Hida et al. |
| 4,863,546 | A | | 9/1989 | Melzer et al. |
| 4,897,533 | A | | 1/1990 | Lyszczarz |
| 4,897,534 | A | | 1/1990 | Haghiri-Tehrani |
| 4,897,602 | A | | 1/1990 | Lin et al. |
| 4,931,853 | A | | 6/1990 | Ohuchi et al. |
| 4,965,689 | A | | 10/1990 | Normann et al. |
| 4,980,802 | A | | 12/1990 | Champagne et al. |
| 5,013,900 | A | | 5/1991 | Hoppe |
| 5,067,008 | A | | 11/1991 | Yanaka et al. |
| 5,097,117 | A | | 3/1992 | Champagne et al. |
| 5,173,840 | A | | 12/1992 | Kodai et al. |
| 5,200,601 | A | | 4/1993 | Jarvis |
| 5,208,450 | A | | 5/1993 | Uenishi et al. |
| 5,244,840 | A | | 9/1993 | Kodai et al. |
| 5,250,341 | A | | 10/1993 | Kobayashi et al. |
| 5,268,043 | A | | 12/1993 | McCowen |
| 5,268,699 | A | | 12/1993 | Laute et al. |
| 5,272,596 | A | | 12/1993 | Honore et al. |
| 5,283,423 | A | | 2/1994 | Venambre |
| 5,341,421 | A | | 8/1994 | Ugon |
| 5,357,091 | A | | 10/1994 | Ozawa et al. |
| 5,387,306 | A | | 2/1995 | Jarvis |
| 5,396,650 | A | | 3/1995 | Terauchi |
| 5,399,223 | A | | 3/1995 | Vogt |
| 5,399,847 | A | | 3/1995 | Droz |
| 5,399,907 | A | | 3/1995 | Nguyen et al. |
| 5,412,192 | A | | 5/1995 | Hoss |
| 5,438,219 | A | | 8/1995 | Kotzan et al. |
| 5,438,750 | A | | 8/1995 | Venambre |
| 5,448,110 | A | | 9/1995 | Tuttle et al. |
| 5,479,416 | A | | 12/1995 | Snodgrass et al. |
| 5,519,201 | A | | 5/1996 | Templeton, Jr. et al. |
| 5,567,362 | A | | 10/1996 | Grun |
| 5,585,618 | A | | 12/1996 | Droz |
| 5,598,032 | A | | 1/1997 | Fidalgo |
| 5,612,532 | A | | 3/1997 | Iwasaki |
| 5,688,738 | A | | 11/1997 | Lu |
| 5,719,746 | A | | 2/1998 | Ohbuchi et al. |
| 5,762,741 | A | * | 6/1998 | Kodokian ..... 156/153 |
| 5,774,339 | A | | 6/1998 | Ohbuchi et al. |
| 5,809,633 | A | | 9/1998 | Mundigl et al. |
| 5,817,207 | A | | 10/1998 | Leighton |
| 5,852,289 | A | | 12/1998 | Masahiko |
| 5,951,927 | A | | 9/1999 | Cope |
| 5,969,415 | A | | 10/1999 | Prancz |
| 5,996,897 | A | | 12/1999 | Prancz |
| 6,020,627 | A | | 2/2000 | Fries et al. |
| 6,036,099 | A | | 3/2000 | Leighton |
| 6,036,797 | A | | 3/2000 | Kanazawa |
| 6,081,025 | A | | 6/2000 | Prancz |
| 6,095,424 | A | | 8/2000 | Prancz |
| 6,110,864 | A | | 8/2000 | Lu |
| 6,214,155 | B1 | | 4/2001 | Leighton |
| 6,248,199 | B1 | | 6/2001 | Smulson |
| 6,305,609 | B1 | | 10/2001 | Melzer et al. |
| 6,441,736 | B1 | | 8/2002 | Leighton |
| 6,514,367 | B1 | | 2/2003 | Leighton |
| 6,521,985 | B1 | | 2/2003 | Dossetto |
| 6,557,766 | B1 | | 5/2003 | Leighton |

FOREIGN PATENT DOCUMENTS

| | | |
|---|---|---|
| DE | 39 10 021 A1 | 10/1990 |
| DE | 9111708 | 5/1992 |
| DE | 41 41 972 C2 | 2/1995 |
| DE | 4431606 | 3/1996 |
| DE | 19609636 | 8/1997 |
| DE | 41 05 869 C2 | 5/2000 |
| EP | 0071255 | 2/1983 |
| EP | 0 013 557 B1 | 4/1983 |
| EP | 0193856 | 9/1986 |
| EP | 0 140 230 B1 | 1/1990 |
| EP | 0 154 970 B1 | 1/1990 |
| EP | 0209791 | 4/1993 |
| EP | 0 570 062 A1 | 11/1993 |
| EP | 0 616 906 A3 | 9/1994 |
| EP | 0 616 906 A2 | 9/1994 |
| EP | 0 499 513 B1 | 12/1994 |
| EP | 0 640 940 A2 | 3/1995 |
| EP | 0640940 | 3/1995 |
| EP | 0547524 | 8/1997 |
| EP | 0 778 542 A3 | 12/1998 |
| EP | 0846895 | 1/2000 |
| FR | 2716281 | 8/1995 |
| GB | 1567784 | 5/1980 |
| GB | 2225283 | 5/1990 |
| GB | 2 225 283 A | 5/1990 |
| GB | 2267683 | 12/1993 |
| GB | 2279610 | 1/1995 |
| GB | 2 279 610 A | 1/1995 |
| JP | 57-52088 | 3/1982 |
| JP | 57135137 A | 8/1982 |
| JP | 59-48985 | 3/1984 |
| JP | 60-109817 | 6/1985 |
| JP | 61-123596 | 6/1986 |
| JP | 62-152798 | 7/1987 |
| JP | 63-137897 | 6/1988 |
| JP | 3-55297 | 3/1991 |
| JP | 4-59397 | 2/1992 |
| JP | 4-115996 | 4/1992 |
| JP | 5-208577 | 8/1993 |
| JP | 6-176214 | 6/1994 |
| JP | 6176214 | 6/1994 |
| JP | 6-286377 | 10/1994 |
| WO | WO 87/01651 | 3/1987 |
| WO | WO8808592 | 11/1988 |
| WO | WO 93/20537 | 10/1993 |

| | | |
|---|---|---|
| WO | WO9422111 | 9/1994 |
| WO | WO/9422111 | 9/1994 |
| WO | WO95/09084 | 4/1995 |
| WO | WO97/05569 | 2/1997 |
| WO | WO97/05571 | 2/1997 |

OTHER PUBLICATIONS

Corporate Disclosure Pursuant to Fed.R.Civ.P.7.1(a) dated May 27, 2005.

Markman Ruling—*Leighton* v. *Oberthur, 2005 U.S. Dist. LEXIS 4227* dated Mar. 9, 2005.

Memorandum in Support of Motion for Summary Judgment of Patent Invalidity dated Oct. 18, 2005.

Plaintiffs' Memorandum in Opposition to Defendants' Motion to Dismiss dated Aug. 1, 2005.

Third Amended Complaint for Case No. 04–cv–02496 (CM)(LMS) dated Jul. 27, 2006.

Answer to Third Amended Complaint, Affirmative Defenses and Counterclaims for Case No. 04–cv–02496 (CM)(LMS) dated Aug. 9, 2006.

Amended Answer to Counterclaims, Affirmative Defenses for Case No. 04–cv–02496 (CM)(LMS) dated Aug. 11, 2006.

Burkle; PVC Laminating Press Technology CHK; Printed in W. Germany, date unknown.

Burkle; Plastic Card Lamination Presses; Printed in Germany, date unknown.

Oakwood Design; Lamination Presses for Bank Card & Printed Circuit Board Production; Hertfordshire, England, 1987.

Innovations from Oakwood Design; Lamination Presses for Bank Card & Printed Circuit Board Production; Hertfordshire, England; 1992.

Mazzucchelli Vinyls; Typical Lamination Cycle; TS Jan. 1994.

Vereinigte Kunststoffwerke GmbH; PVC Films ID Cards, Apr. 1986.

Vereinigtekunststoffwerke GmbH; Preface; Staufen Rigid PVC Films for ID Cards; Sep. 1992.

The Smartcard Handbook; pp. 19, 38–39, 301, date unknown.

Burkle; PVC Laminating Press Technology CHK; Printed in W. Germany.

Burkle; Plastic Card Lamination Presses; Printed in Germany.

Oakwood Design Innovations; Customer Service—A Commitment of the First Order; Autumn 1990; M.J. Marketing.

Oakwood Design; Oakwood Series 6 Laminators; Hertfordshire, England, 1987.

Oakwood Design; Instruction Manual For Operation of Oakwood Series 6 F/2/3 and 6E/2/3 Hydraulically Operated PVC Laminator; Letchworth; Oct. 1991.

Oakwood Design; Innovations Winter 91/92; VidCard Systems.

Vereinigte Kunstoffwerke GmbH; Technical Manual for Staufen VKW ID–Card Films; Apr. 1986.

Lamination Logbook; Mar. 8, 1993 through Jan. 8, 1997.

"Smart Card Technology International", cover page, author and date unknown.

Burkle, "Laminating Presses for Plastic Cards", date unknown.

PCT International Search Report for International Application No. PCT/US98/14941 Oct. 30, 1998.*

PCT International Preliminary Examination Report for International Application No. PCT/US98/14941 May 22, 2000.*

* cited by examiner

ULTRA-THIN FLEXIBLE DURABLE RADIO FREQUENCY IDENTIFICATION DEVICES AND HOT OR COLD LAMINATION PROCESS FOR THE MANUFACTURE OF ULTRA-THIN FLEXIBLE DURABLE RADIO FREQUENCY IDENTIFICATION DEVICES

Matter enclosed in heavy brackets [ ] appears in the original patent but forms no part of this reissue specification; matter printed in italics indicates the additions made by reissue.

[This application claims the benefit of U.S. Provisional application Ser. No. 60/142,019, filed Jul. 7, 1999.]

*This application claims the benefit of (a) provisional application Ser. No. 60/142,019, filed Jul. 7, 1999 and (b) Ser. No. 09/158,290, filed Sep. 22, 1998 (now U.S. Pat. No. 6,214,155), which is a continuation of Ser. No. 08/727,789 (now U.S. Pat. No. 5,817,207), which claims the benefit of provisional application Ser. No. 60/005,685. filed on Oct. 17, 1995.*

FIELD OF INVENTION

The present invention relates generally to an ultra-thin flexible durable identification device and the manufacture thereof, and more particularly to radio frequency identification (RFID) devices and the manufacture of RFID devices that can be made in many shapes and sizes and that have superior outer surface matte or glossy such that device may receive dye sublimation printing or the like.

BACKGROUND OF THE INVENTION

Identification devices such as cards, badges, tags labels and bracelets have been used for years for all kinds of identification, such as passports, luggage, all kinds of tickets, hospital/pharmacy medical records and access passes, all of which have not been totally free from theft and counterfeit resulting in the loss of thousands of dollars. With the rapid progress in new technology the problems associated with the use of such identification devices are being replaced with a more secure identification device having a RFID smart chip that gives more information such as biometrics and read write technology. Thus this more secure plastic device is very difficult or impossible to fraudulently manipulate.

SUMMARY OF THE INVENTION

The present invention is therefore directed to a ultra-thin flexible durable plastic device made in all shapes and sizes having at least one electronic element embedded therein and to a hot or cold lamination method for the manufacture of plastic devices including at least one electronic element therein. The device can be used as cards, tags, badges, bracelets and labels. The device is durable and flexible and it can be used as a sticker when adhesive is applied because it is ultra-thin. The device has an overall thickness in the range of 0.005 inches to 0.033 inches and comprises a plastic or other substrate core having at least one electronic element embedded therein with at least one of the upper and lower surfaces of the core comprising a coating printed or otherwise applied thereon. An overlaminate film is preferably provided over the coated surface of the core and the resulting device has a variation in thickness across the surfaces thereof of no greater than approximately 0.0005 inches. The hot or cold lamination method of the present invention comprises the steps of providing first and second plastic or other substrate core sheets, positioning at least one electronic element between the first and second core sheets to thus form a core and placing the core in a laminator and closing the lamination without applying laminator ram pressure to the core. A heat cycle is applied to the core sheets in the laminator thus liquefying or partially liquefying the sheets. The laminator ram pressure is then increased in combination with the heat. A cooling cycle is then applied to the core in the laminator preferably with an associated increase in ram pressure, and the core is removed from the laminator. The sheets are then cut separating the individual device from the core sheet and this results in a plastic device having a thickness in the range of approximately 0.005 inches-0.033 inches with a surface glossy or matte dependent on customer's request. The invention is also directed to a device manufactured in accordance with the above process which results in a plastic device having a thickness in the range of approximately 0.005 inches-0.033 inches with a surface smoothness of at least approximately 0.0005 inches. The present invention provides numerous advantages over known plastic devices and known plastic device with electronic elements such as a computer chip embedded therein with a pleasing aesthetic appearance and able to withstand various harsh chemicals and pressures.

DETAILED DESCRIPTION OF THE INVENTION

The present invention relates to a ultra-thin flexible durable plastic device including at least one electronic element embedded therein. The present invention also relates to a hot lamination process for the manufacture of plastic devices and more particularly to a hot or cold lamination process for the manufacture of plastic devices that include an electronic element such as a computer chip or other electronic element embedded therein. The electronic element may preform a wide variety of functions and take a wide variety of forms. Such devices without regard to the particular electronic element embedded therein, will hereinafter be referred to as radio frequency identification (RFID) devices. The present invention also relates to a ultra-thin durable plastic or other composition device in all shapes and sizes that can withstand harsh chemicals and various pressures that could be used in the are-o-space industry.

Figure 1:
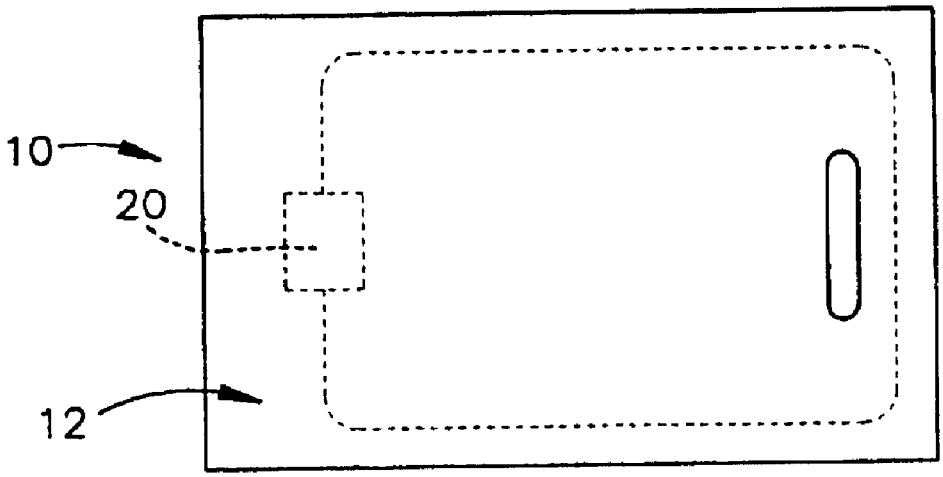
FIG. 1 is a top plan view of a radio frequency device in accordance with the present invention.
Figure 2:
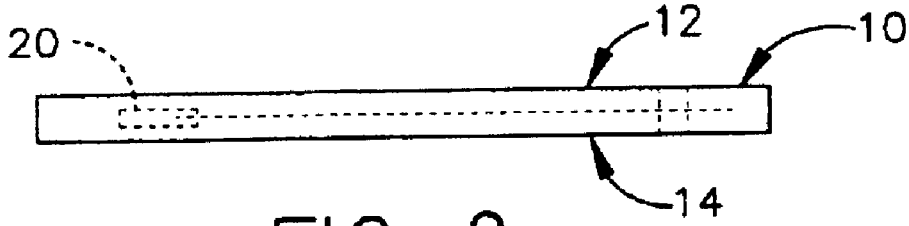
FIG. 2 is a side elevational view of the device shown in FIG. 1.
Figure 3A:
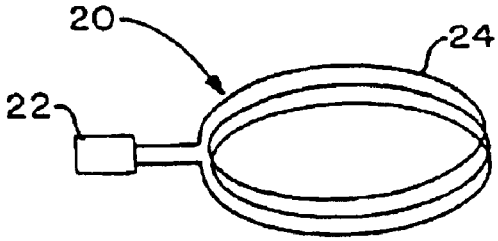
FIGS. 3A-3D are top plan views of various electronic elements that may be embedded in a device in accordance with the present invention.
Figure 3B:
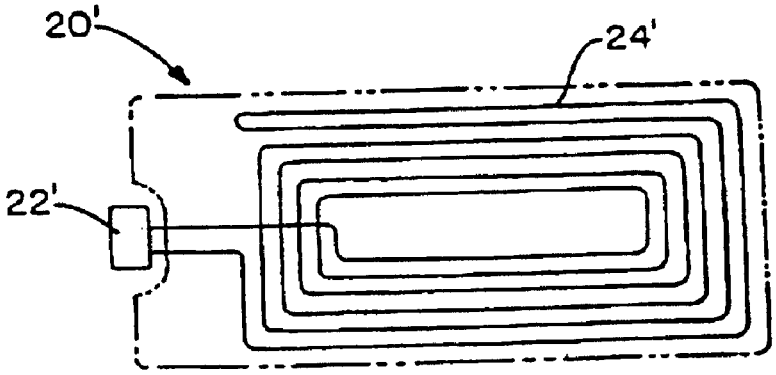
Figure 3C:
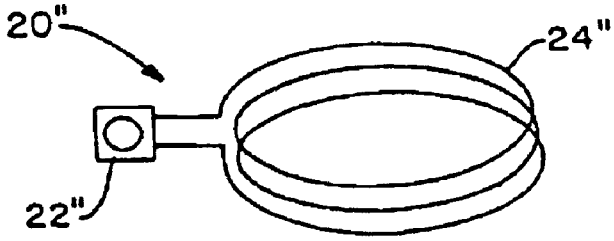
Figure 3D:
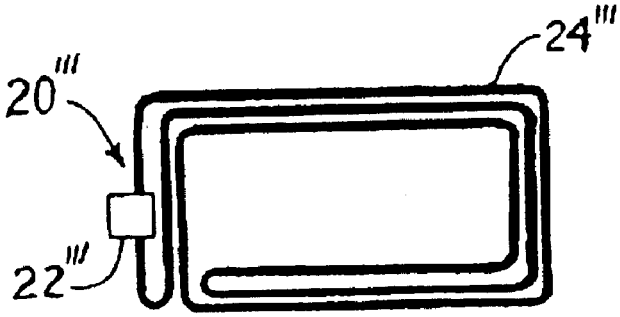
Figure 4:
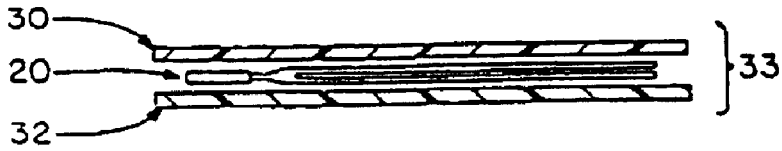
FIG. 4 is an exploded schematic view of an electronic element positioned between two plastic core sheets to form a core.
Figure 5:
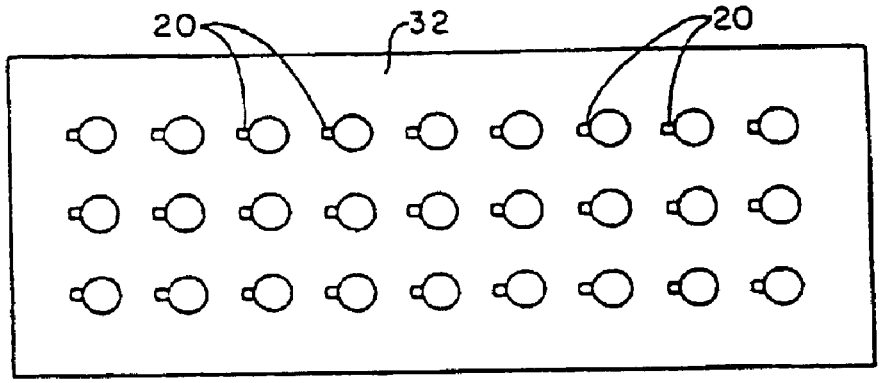
FIG. 5 is a top plan view of a plurality of electronic elements positioned on a sheet of plastic or other substrate core stock such that they may be covered by a similar sheet or core stock.
Figure 6:
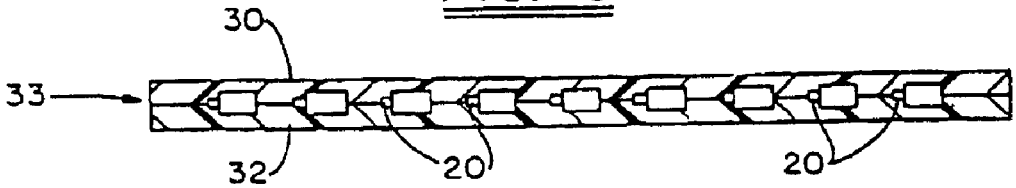
FIG. 6 is a side plan view illustrating top and bottom sheets that may be pre-printed or blank sheets and also a schematic cross sectional view of one or more electronic elements positioned between sheets of plastic or other substrate core stock.

Referring now to FIG. 1 there can be seen a plastic RFID device 10 manufactured in accordance with the present invention and including an electronic element 20 embedded therein. Device 10 includes an upper surface 12 and a lower surface 14. Electronic element 20 may take a wide variety of forms and perform a wide variety of functions. As shown in FIGS. 3A-3D respectively, electronic element 20,20',20", 20'" may be provided by a micro-chip 22 including a wire antenna 24, connected thereto, a micro-chip 22' and a circuit board antenna 24', a read/write micro-chip 22" and a wire coil antenna 24", a printed screen or litho conductive metallic or carbon ink antenna 24'" or any other suitable electronic element. These electronic elements 20, 20', 20" and 20'" and their insertion into plastic or other substrate devices is not new, however, the present invention provides a new hot or cold lamination process for manufacturing plastic devices 10 with these electronic elements 20, 20', 20" and 20'" embedded therein such that the devices 10 are aestically pleasing meeting customers specifications and demands in such that at least one of the upper and lower surfaces 12, 14 of device 10 is sufficiently smooth and is otherwise capable of of receiving dye sublimation printing or thermo printing. Specifically a device in accordance with the present invention has a thickness of approximately in the range of 0.005 inches to 0.033 inches with a surface smoothness of 0.0005 inches. This surface may also have a matte finish on one or more sides.

As shown in FIGS. 4-10 one or more devices 10 in accordance with the present invention may be manufactured by positioning an electronic element 20 between first and second sheets of core 30, 32 to form a core 33. Preferably is shown in FIGS. 5-10 a plurality of devices are manufactured simultaneously, in thus, a plurality of electronic elements 20 are positioned between the first and second sheets of plastic core stock 30, 32 (only the second sheet 32 being shown in FIG. 5 for clarity). When a plurality of electronic elements 20 are positioned between first and second sheets plastic or other substrates core stock 30, 32 electronic elements 20 are properly positioned relative to one another such that a plurality devices may be out from the resulting core stock. Plastic core sheets 30-32 may be provided by a wide variety of plastics or other substrates, the preferred being polyvinyl chloride (PVC) having a thickness in the range of 0.005 inches to 0.0225 inches. Those skilled in the art will recognize that the thickness of the plastic core sheets will depend upon the thickness of the one or more electronic elements that are to be embedded therebetween. Other suitable plastic that may be utilized include polyester, acrylonitrile-butadiene-styrene (ABS), PET or composition of many.

Figure 7:
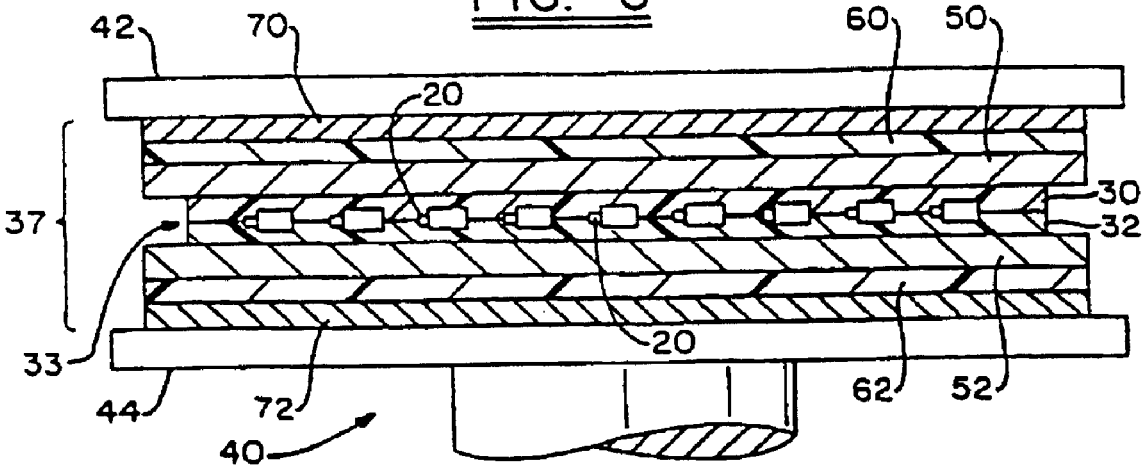
FIG. 7 schematically illustrates a book comprising the core as it is positioned in a laminator apparatus.

Subsequent to placing one or more electronic elements 20 between the first and second sheets 30, 32 of plastic or other substrate core stock to form core 33, this core 33 is placed in a laminator apparatus 40 of the type well known in the art of plastic device manufacturing. As is shown in FIG. 7, laminator 40 includes upper and lower platens 42, 44 for applying ram pressure to an article positioned therebetween. In addition to the ability to apply ram pressure, laminator 40 is preferably of the type having controlled platens 42, 44 that provide both heat and chill cycles and preferably includes cycle timer to regulate cycle time. (Other laminators of different designs may be used also that have a single ram for the hot platens and a single ram for the cold platens, known as a dual stack laminator, or roll laminators with hot rollers and chill rollers.) Core 33 is positioned between first and second laminating plates 50, 52, one of which is preferably matte finished to provide laminated core 33 with at least one textured outer surface. First and second laminating pads 60, 62 are positioned outside of the laminating plates 50, 52 and first and second steel plates 70, 72 are likewise positioned outside of pads of 60, 62 and the entire assembly forms a book 37 for being positioned in laminator 40 between plates 42, 44.

Once book 37 is positioned in laminator 40 as shown in FIG. 7, the first lamination cycle is initiated by closing laminator platens 42, 44, preferably applying little or no ram pressure to book 37. A laminator heat cycle is initiated bringing the temperature of platens 42, 44 up to range of 275° F. to 400° F. and most preferably up to a range of 300° F. to 370° F. for a period of greater than 5 minutes and preferably in the range of 7 to 10 minutes. Once the heat cycle has been applied to the book 37 as is set forth above, the ram pressure of laminator 40 is increased to facilitate the flow of the plastic core sheets 30, 32 so that the one or more electronic elements 20 are encapsulated thereby, and so that sheets 30, 32 form a uniform core 33 (seen most clearly in FIGS. 8-10 with upper and lower surfaces 34, 35. As mentioned, the use of matte finished laminator plates 50, 52 provides surfaces 34, 35 with a slightly roughened or textured quality which will facilitate the application of a coating thereto as is discussed below. The ram pressure applied during the heat cycle and the length of the heat cycle may vary, depending especially upon the size of sheets 30, 32. For example, the cycle time may be in the range of 10-15 minutes. In one example, a ram pressure of 940.135 pounds per square inch (p.s.i.) was applied for 10-15 minutes to form a uniform core 33, using sheets 30, 32, of a size in the range of 12 inches by 24 inches to 24 inches by 36 inches.

Subsequent to the above heat cycle, laminator 40 applies a chill cycle to book 37 during which time and ram pressure of the laminator 40 is increased, preferably by approximately 25%, until the platens 42, 44 have been cooled in approximately 40° F. to 65° F. for approximately 10-15 minutes. Core 33 may then be removed from laminator 40 for additional processing. If a single lamination step is used, a glossy plate might be used at this point of lamination to provide a mirror finish on the device. At this point the sheets will be ready for cutting out the devices separating the plurality of devices from the sheets.

Figure 8:
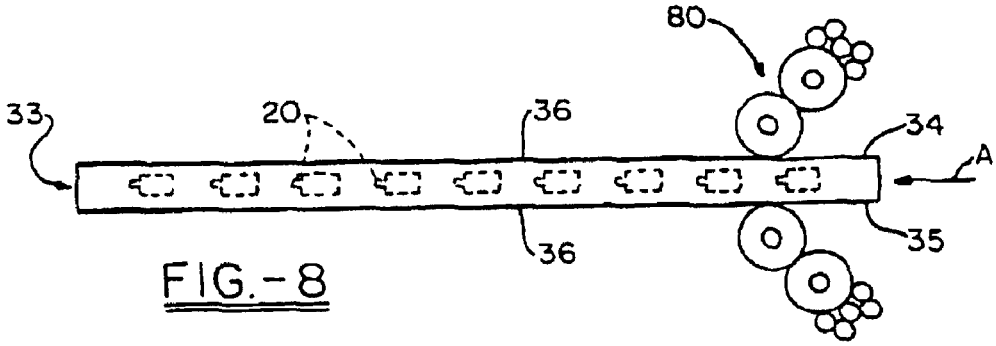
FIG. 8 schematically illustrates the core as it is being printed on after removal from the laminator using a printing press or similar printing apparatus.

Subsequent to the removal of core 30 from laminator 40 and as illustrated in FIG. 8 core 33 is coated on at least one of its upper and lower surfaces 34, 35 with a layer of printing ink 36. This may be accomplished using a wide variety of printing techniques such as offset printing, letter-press printing, screen printing, roller coating, spray printing, litho-printing and other suitable printing techniques. As shown in FIG. 8 core 33, is fed in the direction indicated with arrow A through a printing press, a lithographic printer or a similar apparatus 80. This printing step is performed to coat at least one surface 34, 35 of core 33 with a layer of aesthetically pleasing ink 36. This layer of ink 36 cosmetically hides the one or more electronic elements 20 that are embedded within core 33 and prevents these one or more electronic elements 20 from showing through the relatively thin core 33. In this manner, the one or more electronic elements 20 encapsulated in core 33 are completely hidden from view without requiring the plastic used in the manufacture core 33 to be excessively thick.

Figure 9:
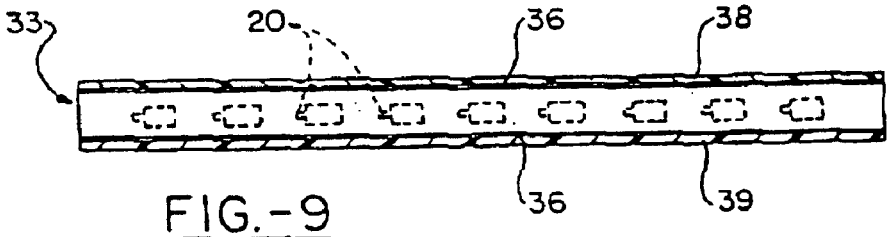
FIG. 9 is a cross-sectional view schematically illustrating the application of a overlaminate film to at least one side of the core beginning a second lamination step as illustrated in FIG. 10 when necessary to protect the printing.
Figure 10:
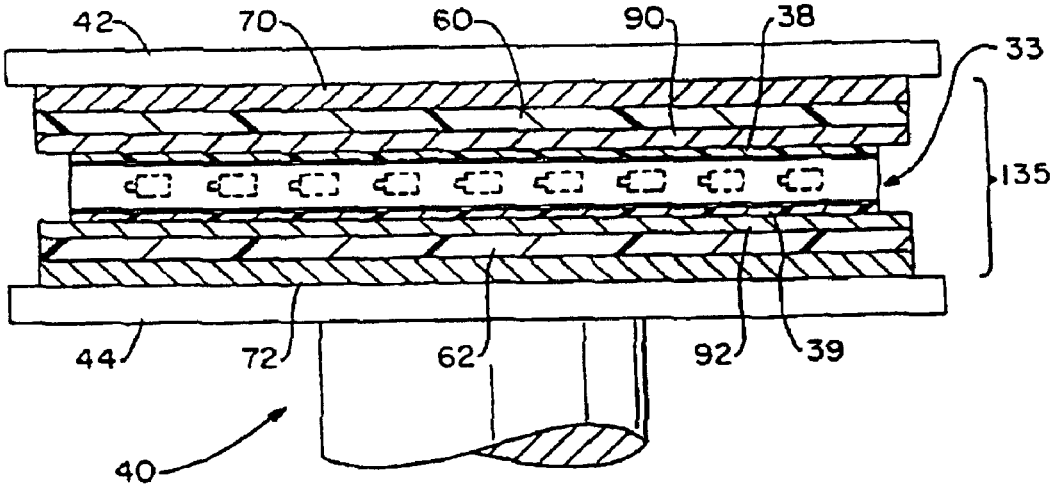
FIG. 10 schematically illustrates the core with overlaminate film as it is placed in a laminator for final processing to form a sheet core stock containing electronic devices.

Referring now to FIGS. 9-10, the final processing of core 33 which now comprises a layer of ink 36 or the like on at least one surface 34, 35 thereof, is schematically illustrated. A layer of overlaminate film such as clear overlaminate film 38,39 is positioned on at least one ink coated surface 34,35 of core 33, and preferably core 33 is positioned between two similar sheets of overlaminate film 38,39 as shown. Overlaminate film is very thin, for example in the range of 0.0015 inches thick. A book 135 is then constructed for insertion into laminator 40 as is schematically illustrated FIG. 10. Book 135 comprising core 33, including at least one layer of ink 36 and at least one layer of overlamination film 38,39 is positioned between laminating plates which are preferably highly polished plates such as mirror finished stainless steel plates 90, 92. Book 135 also comprises first and second laminating pads 60, 62 and first and second steel plates 70, 72 as is discussed above in relation to FIG. 7.

When book 135 is positioned between upper and lower platens 42, 44 of laminator 40 as shown in FIG. 10, the laminator is closed and a heat cycle in the range of 175° F. to 300° F. and most preferably in the range of 180° F. to 275° F. is applied to book 135 for a period of 10 to 25 minutes with a ram pressure that varies depending upon sheet size or the ram size of the laminator 40, but which is typically approximately 1000 p.s.i. with an 18 inch diameter ram. The laminator 40 is then caused to execute a chill cycle, preferably with a corresponding increase in ram pressure. For example, the chill temperature may be in the range of 40° F. to 65° F. and last for a period of 10 to 25 minutes. A ram pressure increase of approximately 25% over the pressure used for the heat cycle has been found to be most preferable.

Subsequent to the above described second lamination cycle as illustrated in FIG. 10, a sheet of plastic or other substrate core stock is provided which comprises at least core 33 with at least one surface 34,35 thereof covered by a layer of ink 36 and with at least one surface 34, 35 thereof covered by a layer of overlaminate film 36, 39.

Preferably plastic device stock manufactured in accordance with the present invention comprises core 33 covered on both surfaces 34, 35 with a layer of ink 36 which is positioned between layers of overlaminate film 38, 39 all of which has been laminated together as described. One or more devices 10 then may be cut from the resulting plastic core stock and device 10 will have a thickness of in the range of 0.005 inches to 0.033 inches with variation in overall thickness across the surfaces 12,14 thereof being no greater than approximately 0.0005 inches. The one or more devices 10 can thus be said to have a surface smoothness of approximately 0.0005 inches or better. Thus, a device 10 manufactured in accordance with the present invention includes at least one surface 12, 14 at preferably both surfaces 12, 14 that are sufficiently smooth and regular to receive dye sublimation printing.

Those skilled in the art will recognize that the forgoing descriptions has set forth the preferred embodiment of the invention in particular detail and it must be understood that numerous modifications, substitutions and changes may be undertaken without departing from the true spirit and scope of the present invention as defined by the ensuring claims.

What is claimed is:

1. A process for incorporating at least one electronic element in the manufacture of a plastic device comprising the steps of:

(a) providing first and second plastic core sheets;

(b) positioning said at least one electronic element in the absence of a non-electronic carrier directly between said first and second plastic core sheets to form a core, said plastic core sheets defining a pair of inner and outer surfaces of said core;

(c) positioning said core in a laminator apparatus, and subjecting said core to a heat and pressure cycle, said heat and pressure cycle comprising the steps of:

(I) heating said core to a first period of time;

(II) applying a first pressure to said core for a second [prior] *period* of time such that said at least one electronic element is encapsulated by said core;

(III) cooling said core while applying a second pressure to said core;

(d) coating at least one of said outer surfaces of said core with a layer of ink; and (e) applying a layer of overlaminate film to at least one outer surface of said core.

2. The process for incorporating at least one electronic element in the manufacture of a plastic device as recited in claim 1, wherein said laminator apparatus has first and second laminating plates, at least one of said first and second laminating plates having a matte finish for creating a textured surface on at least one side of said core.

3. The process for incorporating at least one electronic element in the manufacture of a plastic device as recited in claim 2, wherein each of said first and second laminating plates has a matte finish for creating said textured surface on both outer surfaces of said core.

4. The process for incorporating at least one electronic element in the manufacture of a plastic device as recited in claim 1, wherein said first and second plastic core sheets are made from a material selected from the group consisting of polyvinyl chloride, polyester, and acrylonitrile-butadiene-styrene, each of said sheets having a thickness in the range of 0.005 inches-0.0125 inches.

5. The process for incorporating at least one electronic element in the manufacture of a plastic device as recited in claim 1, wherein said first and second plastic core sheets have a thickness of approximate 0.005 inches-0.0125 inches.

6. The process for incorporating at least one electronic element in the manufacture of a plastic device as recited in claim 1, wherein said second pressure is greater than said first pressure.

7. The process for incorporating at least one electronic element in the manufacture of a plastic device as recited in claim 6, wherein said second pressure is at least approximately 25% greater than said first pressure.

8. The process for incorporating at least one electronic element in the manufacture of a plastic device as recited in claim 1, wherein said core is heated in step (c) (I) to a temperature in the range of 275° F. to 400° F.; and said first period of time is at least five (5) minutes.

9. The process for incorporating at least one electronic element in the manufacture of a plastic device as recited in claim 1, wherein said first ram pressure is approximately 1000 p.s.i. and said second period of time is at least 10 minutes.

10. The process for incorporating at least one electronic element in the manufacture of a plastic device as recited in claim 1, wherein said step (d) is carried out utilizing a printing process.

11. The process for incorporating at least one electronic element in the manufacture of a plastic device as recited in claim 1, wherein said step (d) is carried out utilizing a coating technique selected from the group consisting of silk screen printing, offset printing, letterpress printing, screen printing, roller coating, spray printing and litho-printing.

12. The process for incorporating at least one electronic element in the manufacture of a plastic device as recited in claim 1 wherein said step (e) of applying a layer of overlaminate film comprises the further steps of:

(a) positioning an overlaminate film on at least one ink coated surface of said core;

(b) subjecting said core to a second heat and pressure cycle comprising the steps of;

(I) heating said core to a temperature between approximately 175° F. to 300° F. for approximately 10 to 25 minutes;

(II) applying approximately 1000 p.s.i. ram pressure to said core; and (III) cooling said core to a temperature in the range of approximately 40° F. to 65° F. for approximately 10 to 25 minutes.

13. The process for incorporating at least one electronic element in the manufacture of a plastic device as recited in claim 1, wherein said at least one electronic element is a micro-chip and an associated antenna of wire, copper etched, screen printed or litho-printed conductive inks or carbon inks.

14. The process for incorporating at least one electronic element in the manufacture of a plastic device as recited in claim 1, wherein said at least one electronic element is a micro-chip and an associated circuit board antenna.

15. The process for incorporating at least one electronic element in the manufacture of a plastic device as recited in claim 1, wherein said at least one electronic element is a read/write integrated chip and an associated antenna.

16. The process for incorporating at least one electronic element in the manufacture of a plastic device as recited in claim 1, wherein said at least one electronic element is a micro-chip and an associated printed antenna.

17. A hot lamination process for the manufacture of plastic devices, said process comprising the steps of:

(a) providing first and second plastic core sheets;

(b) positioning at least one electronic element in the absence of a non-electric carrier directly between said first and second plastic sheets to form a layered core;

(c) positioning said core in a laminator apparatus, and subjecting said core to a heat and pressure cycle, said heat and pressure cycle comprising the steps of:

(I) heating said core in said laminator apparatus, in the presence of a minimal first ram pressure, to a temperature which causes controlled flow of said plastic which makes up said first and second plastic core sheets;

(II) applying a second pressure uniformly across said core for encapsulating said at least one electronic element within said controlled flow plastic;

(III) subsequently cooling said core in conjunction with the concurrent applicantion of a third pressure uniformly across said core, said core including upper and lower surfaces.

18. The process as recited in claim 15 wherein said first and second core layers are devoid of any appreciable cut outs.

*19. A process for incorporating an electronic element in a plastic device, comprising the steps of:*

*(a) providing first and second plastic core sheets;*

*(b) positioning the electronic element between the first and second plastic core sheets to form a core;*

*(c) positioning the core in a laminator apparatus, and subjecting the core to a heat and pressure cycle, the heat and pressure cycle comprising the steps of:*

*(I) heating the core;*

*(II) applying a first pressure to the core such that the electronic element is encapsulated by the core; and*

*(III) cooling the core while applying a second pressure to the core.*

*20. The process of claim 19, wherein step (c)(III) comprises cooling the core while applying a second pressure to the core, wherein the second pressure is greater than the first pressure.*

*21. The process of claim 20, wherein step (b) comprises positioning the electronic element in the absence of a non-electronic carrier between the first and second plastic core sheets to form the core.*

*22. The process of claim 20, wherein step (b) comprises positioning the electronic element in the absence of a non-electronic carrier directly between the first and second plastic core sheets to form the core.*

*23. The process of claim 19, wherein step (c)(III) comprises cooling the core while applying a second pressure to the core, wherein the second pressure is approximately at least 10% greater than the first pressure.*

*24. The process of claim 19, wherein step (c)(I) comprises heating the core under a third pressure, wherein the third pressure is less that the first pressure.*

*25. The process of claim 20, wherein step (c)(II) comprises applying the first pressure uniformly to the core such that the electronic element is encapsulated by the core.*

*26. The process of claim 20, wherein step (c)(III) comprises cooling the core while applying the second pressure uniformly to the core.*

*27. The process of claim 20, wherein the electronic element comprises a micro-chip.*

*28. The process of claim 27, wherein the electronic element further comprises a circuit board antenna.*

*29. The process of claim 27, wherein the electronic element includes a protective coating thereon.*

*30. A process for manufacturing a plastic device that includes an electronic element therein, comprising the steps of:*

*(a) providing first and second plastic core sheets;*

*(b) positioning the electronic element between the first and second plastic core sheets to form a core;*

*(c) positioning the core in a laminator apparatus;*

*(d) heating the core;*

*(e) causing the laminator apparatus to apply a first pressure to the core such that the electronic element is encapsulated by the core; and*

*(f) cooling the core while the laminator apparatus applies a second pressure to the core, wherein the second pressure is greater than the first pressure.*

*31. The process of claim 30, wherein step (f) comprises cooling the core while the laminator apparatus applies the second pressure to the core, wherein the second pressure is approximately at least 10% greater than the first pressure.*

*32. The process of claim 31, wherein step (b) comprises positioning the electronic element in the absence of a non-electronic carrier between the first and second plastic core sheets to form the core.*

*33. The process of claim 31, wherein step (b) comprises positioning the electronic element in the absence of a non-electronic carrier directly between the first and second plastic core sheets to form the core.*

*34. The process of claim 30, wherein the electronic element comprises a micro-chip.*

*35. The process of claim 34, wherein the electronic element further comprises a circuit board antenna.*

*36. The process of claim 34, wherein the electronic element includes a protective coating thereon.*

*37. A process for incorporating an electronic element in a plastic device, wherein the electronic element has a top surface and a bottom surface, comprising the steps of:*

(*a*) *providing top and bottom plastic core sheets;*

(*b*) *positioning the electronic element between the top and bottom plastic core sheets to form a core, wherein the top surface of the electronic element is in contact with the top plastic core sheet;*

(*c*) *positioning the core in a laminator apparatus, and subjecting the core to a heat and pressure cycle, the heat and pressure cycle comprising the steps of:*

(*I*) *heating the core;*

(*II*) *applying a first pressure to the core so that the electronic element is encapsulated by the core; and*

(*iii*) *cooling the core while applying a second pressure to the core, wherein the second pressure is greater than the first pressure.*

*38. The process of claim 37, wherein step* (*c*)(*III*) *comprises cooling the core while applying a second pressure to the core, wherein the second pressure is approximately at least 10% greater than the first pressure.*

*39. The process of claim 37, wherein step* (*b*) *comprises positioning the electronic element between the top and bottom plastic core sheets to form the core, wherein the top and bottom surfaces of the electronic element are in contact with the top and bottom plastic core sheets, respectively.*

*40. The process of claim 37, wherein step* (*b*) *comprises positioning the electronic element in the absence of a non-electronic carrier between the top and bottom plastic core sheets to form the core.*

*41. The process of claim 37, wherein step* (*b*) *comprises positioning the electronic element in the absence of a non-electronic carrier directly between the top and bottom plastic core sheets to form the core.*

*42. The process of claim 37, wherein the electronic element comprises a micro-chip.*

*43. The process of claim 42, wherein the electronic element further comprises a circuit board antenna.*

*44. The process of claim 42, wherein the electronic element includes a protective coating thereon.*

* * * * *